P. KORUD.
MILK BOTTLE DISPENSER.
APPLICATION FILED DEC. 17, 1915.
1,193,027.
Patented Aug. 1, 1916.
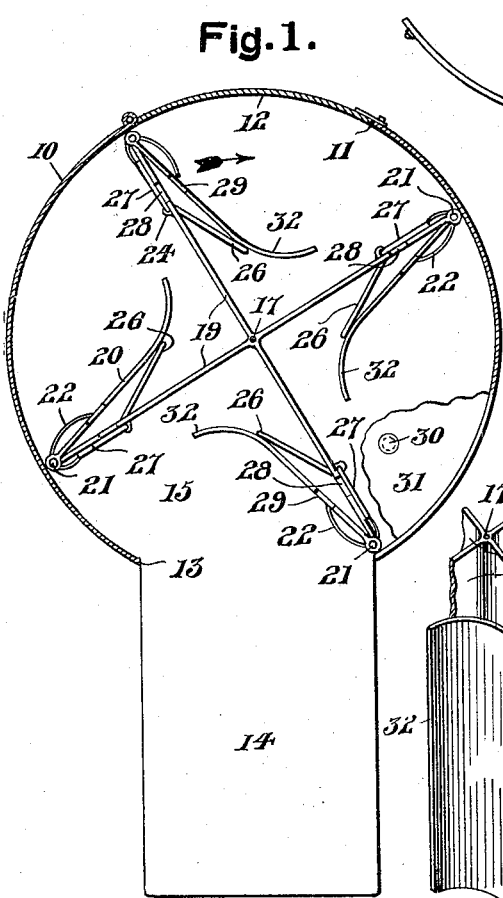
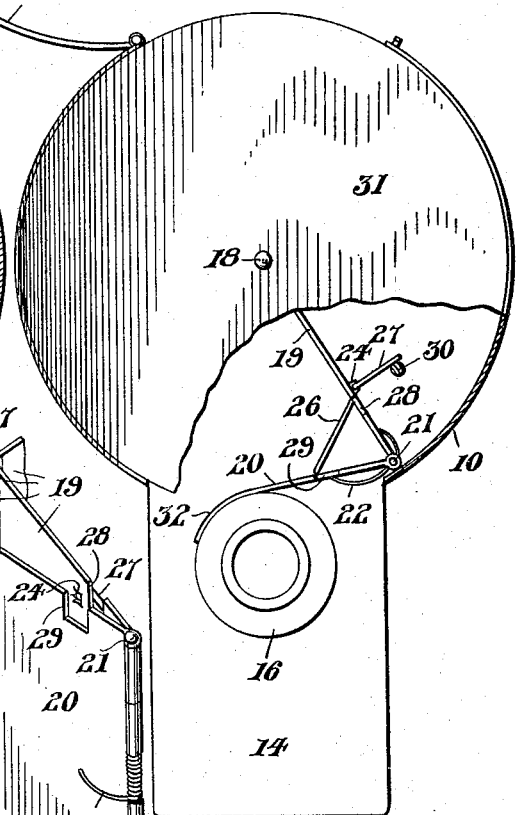
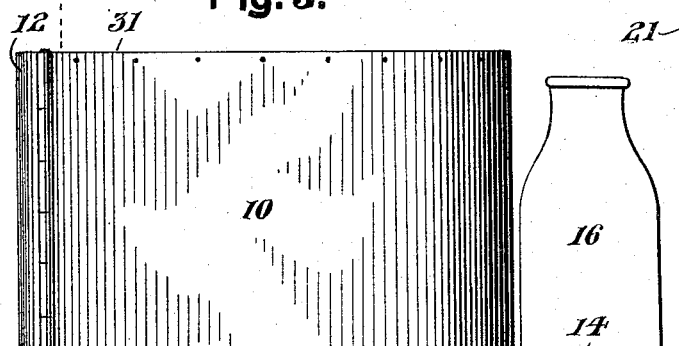
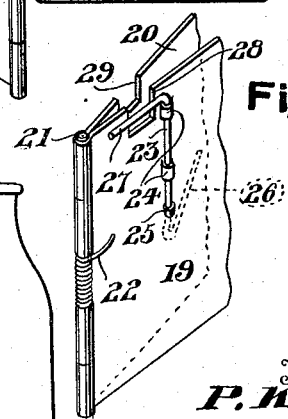
Inventor
P. Korud
By A. M. Wilson
Attorney

UNITED STATES PATENT OFFICE.

PETRO KORUD, OF CLEVELAND, OHIO.

MILK-BOTTLE DISPENSER.

1,193,027.  Specification of Letters Patent.  Patented Aug. 1, 1916.

Application filed December 17, 1915. Serial No. 67,388.

*To all whom it may concern:*

Be it known that I, PETRO KORUD, a subject of the Emperor of Austria-Hungary, residing at Cleveland, in the county of Cuyahoga and State of Ohio, have invented certain new and useful Improvements in Milk-Bottle Dispensers, of which the following is a specification.

This invention relates to certain new and useful improvements in milk bottle dispensers.

The primary object of the invention is to provide a device especially adapted for dispensing bottles of milk by transferring the same from the exterior to the interior of a building without having a free open passage-way which would allow unauthorized entrance to the building.

A further object of the device is to provide a ready means whereby the milk vender may readily dispense the bottles of milk to the interior of a building thus preventing a theft thereof which sometimes occurs when the bottles of milk are left upon the porch or doorstep, the device being so arranged that after the admission of the milk bottle within the building, it will be impossible for any one to gain access to the same from outside the building.

In providing the present invention, the same is designed for permanent positioning through the side of a building, such as the kitchen wall illustrated by dotted lines 33, in Figure 3 of the drawing, and where the vender of milk and similar articles may have ready access to a closure door of the device externally of the building and whereby the vended article may be positioned in the device and forcibly propelled therethrough and into the building upon a supporting shelf carried by the device, the mechanism of the latter being such as to prevent any return of the milk bottle outwardly of the device or any access by an unauthorized person inwardly thereof.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—Fig. 1 is a horizontal sectional view through the device with a portion thereof shown in top plan. Fig. 2 is a top plan view partially broken away and illustrating the device during the operation thereof. Fig. 3 is a side elevation of the same partially broken away. Fig. 4 is a perspective view of the rotor and one of the dispensing wings, parts being broken away, and, Fig. 5 is a perspective view of an outer end portion of one of the dispensing wings and the adjacent rotor plate.

In the present embodiment of the invention, a cylindrical casing 10 is provided having a rear receiving opening 11 closable by a hinged door 12 while a similar opening 13 is provided in the opposite side of the casing being unprovided with any closure but having a receiving shelf 14 extending outwardly therefrom, the said shelf being a continuation of the casing bottom 15.

It is to be understood that the casing 10 is permanently positioned within a wall of a building not shown so that a milk bottle 16 or any similar article may be dispensed into the building by forcing the same through the inlet rear opening 11 which will be positioned exteriorly of the building and thence through the casing 10 and through the outlet opening 13 thereof upon the receiving shelf 14 which shelf is positioned interiorly of the building.

A substantially star-shaped rotor 17 is journaled upon vertical trunnions 18 arranged centrally of the casing 10 and has a desired number of radially-extending arms or plates 19, the same being herein illustrated as four in number. The plates 19 are of equal length and extend to a point adjacent the inner face of the casing 10 and each is provided with a dispensing wing 20 connected by a spring hinge 21 to the outer edge thereof, the spring 22 of the said hinge normally retaining each of the said wings tensioned adjacent the respective carrying plate.

A Z-shaped member 23 is provided for the wings 20, being journaled in struck-up loops 24 upon the side of the adjacent plate 19 which is opposite to the wing 20 to be operated upon while the said member 23 has its lower end extended through the plate 19 as at 25 with the lower arm 26 of the operating member positioned upon the side of the plate 19 which is adjacent to the dispensing wing 20, the said arm being in normal engagement with the adjacent wing as best illustrated in Fig. 1 of the drawings. The upper arm 27 of the member 23 is positioned transversely of a top notch 28 in the carrying plate 19, which notch 28 is in alinement with a notch 29 of similar dimensions within the upper edge of the adjacent wing 20.

A depending post 30 is carried by the top 31 of the casing 10 and is of a desirable length to pass through the said notches 28 and 29 during the operative revolutions of the rotor 17.

The rotor 17 is designed to be revolved in the direction indicated by the arrow in Fig. 1 of the drawings and it will be seen that the milk vender may open the outside door 12 of the device and position a bottle 16 within the casing 10 upon the bottom 15 thereof and in substantial contact with the curved free end portion 32 of the adjacent dispensing wing 20. The vender may then forcibly turn the rotor 17 by inserting his hand through the outside inlet opening 11 and this movement will pass the wings and plates around in an arcuate path through the casing 10 so that the post 30 will freely pass through the notches 29 of the wings but will be forcibly engaged by the operating member arm 27 immediately after passing through the notch 28 of the adjacent plate 19. This forcible movement of the plate 19 and engagement of the arm 27 with the fixed post 30 turns the operating member 23 so that the lower arm 26 moves the adjacent wing 20 upon its hinge 21 and forces the bottle 16 which is in contact with the said wing outwardly of the casing 10 upon the shelf 14 and interiorly of the building.

It will thus be seen that the milk vender may readily dispense the milk container inwardly of the building provided with the present device and that a passage from the exterior to the interior of the building is at all times closed against any entrance of a hand or any member from without, and it will also be seen that any attempt at reversing the rotation of the rotor 17 will bring the operating member arms 27 in contact with the fixed post 30 which will act as a stop and prevent any further turning of the rotor in that direction.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A device of the class described, comprising a casing having oppositely-arranged article inlet and outlet openings in the sides thereof, a receiving shelf adjacent said outlet opening, an article transferring rotor including radial plates within the said casing, and automatically actuating article dispensing wings carried by the said rotor plates.

2. A device of the class described, comprising a cylindrical casing having inlet and outlet openings in the opposite sides thereof, a radially projecting shelf carried by the bottom of the said casing adjacent the said outlet opening thereof, a rotor including radial plates centrally trunnioned within the said casing, and automatically actuating article dispensing wings carried by the said rotor plates.

3. A device of the class described, comprising a cylindrical casing having inlet and outlet openings in the opposite sides thereof, a radially projecting shelf carried by the bottom of the said casing adjacent the said outlet opening thereof, a rotor centrally trunnioned within the said casing and having radially projecting plates extending adjacent the side wall of the casing, curved dispensing wings hinged to the outer edges of the said plates, and operating and return stop means for the said wings.

4. A device of the class described, comprising a cylindrical casing having inlet and outlet openings in the opposite sides thereof, a radially projecting shelf carried by the bottom of the said casing adjacent the said outlet opening thereof, a rotor centrally trunnioned within the said casing and having radially projecting plates extending adjacent the side wall of the casing, dispensing wings spring-hinged to the outer edges of the said plates and having curved article engaging free end portions, operating members for the said wings, and a stop post for the said operating members.

5. A device of the class described, comprising a cylindrical casing having inlet and outlet openings in the opposite sides thereof, a radially projecting shelf carried by the bottom of the said casing adjacent the said outlet opening thereof, a rotor centrally trunnioned within the said casing and having radially projecting plates extending adjacent the side wall of the casing, dispensing wings spring-hinged to the outer edges of the said plates and having curved article engaging free end portions, the upper edges of the said wings and plates being provided with alining notches, a Z-shaped operating member journaled to each of the said plates at the side thereof opposite to the adjacent dispensing wing, the said operating member having its upper arm positioned transversely of the said plate notch and the said member extending through the carrying plate and having its lower arm positioned upon the same side and in constant contact with the adjacent dispensing wing, and a fixed post depending from the top of the said casing and positioned within the path of movement of the said wing and plate notches and the said upper arm of the operating member during movement of the said rotor.

In testimony whereof I affix my signature.

PETRO KORUD.

Copies of this patent may be obtained for five cents each, by addressing the "Commissioner of Patents, Washington, D. C."